(12) United States Patent　　(10) Patent No.: US 8,922,844 B2
Seifert　　(45) Date of Patent: Dec. 30, 2014

(54) CYLINDRICAL OBJECT SCANNER

(76) Inventor: Scott C. Seifert, Buffalo, NY (US)

( * ) Notice: Subject to any disclaimer, the term of this patent is extended or adjusted under 35 U.S.C. 154(b) by 85 days.

(21) Appl. No.: 13/552,297

(22) Filed: Jul. 18, 2012

(65) Prior Publication Data

US 2014/0022611 A1　Jan. 23, 2014

(51) Int. Cl.
H04N 1/04　(2006.01)
(52) U.S. Cl.
USPC ............ 358/474; 358/497; 358/496; 358/493
(58) Field of Classification Search
CPC ... H04N 1/193; H04N 1/1017; H04N 1/1013; H04N 2201/1016; H04N 2201/0425
USPC .......... 358/474, 497, 496, 492, 493; 382/312, 382/318, 319; 399/211, 212
See application file for complete search history.

(56) References Cited

U.S. PATENT DOCUMENTS

| | | | |
|---|---|---|---|
| 5,251,072 A * | 10/1993 | Fukuoka et al. ............. | 359/896 |
| 5,898,508 A | 4/1999 | Bekanich | |
| 6,122,481 A | 9/2000 | Rusnack | |
| 6,282,303 B1 * | 8/2001 | Brownlee ...................... | 382/124 |
| 6,603,580 B1 | 8/2003 | Taillie | |
| 6,795,575 B1 * | 9/2004 | Robinson et al. ............. | 382/154 |
| 7,103,201 B2 * | 9/2006 | Scott et al. .................... | 382/124 |
| 7,227,978 B2 * | 6/2007 | Komatsuzaki et al. ....... | 382/124 |
| 7,480,397 B2 * | 1/2009 | Ide ................................ | 382/124 |
| 8,529,982 B2 * | 9/2013 | Bond ............................. | 427/1 |
| 2003/0099002 A1 * | 5/2003 | Yeh et al. ....................... | 358/464 |
| 2010/0172548 A1 * | 7/2010 | Mil'Shtein et al. ........... | 382/117 |

FOREIGN PATENT DOCUMENTS

JP　　　2003271936 A　*　9/2003

* cited by examiner

*Primary Examiner* — Cheukfan Lee
(74) *Attorney, Agent, or Firm* — Vincent G. LoTempio; Brendan S. Lillis; David Stephenson

(57) ABSTRACT

A scanner for scanning an object having a circumferential surface, the scanner comprising a housing with a glass pane defining an internal area containing camera assembly configured to scan the circumferential surface of the object, and a carriage assembly to rotatably move the object across the glass pane of the scanner in synchronous motion with the movement of the camera assembly.

19 Claims, 4 Drawing Sheets

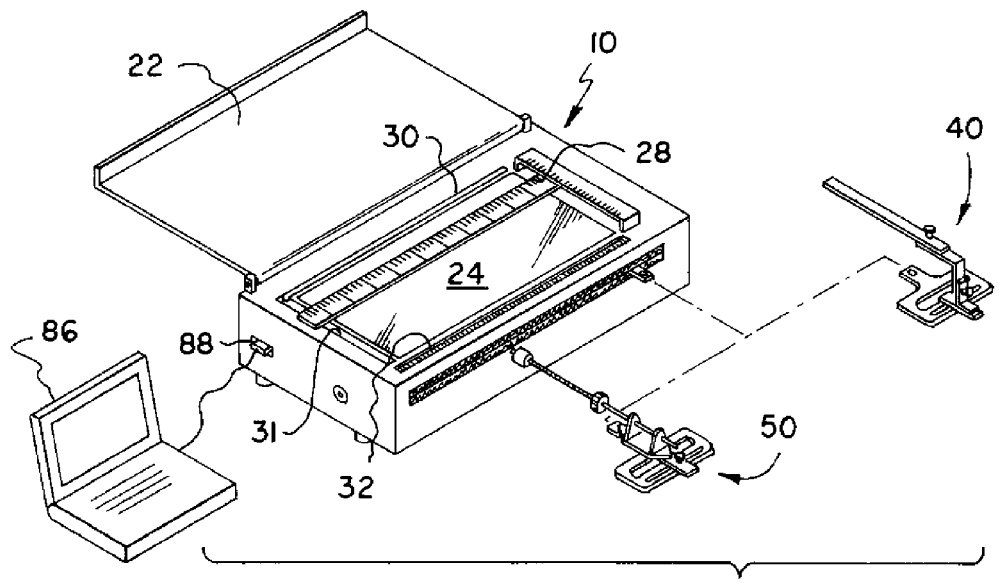
FIG. 1
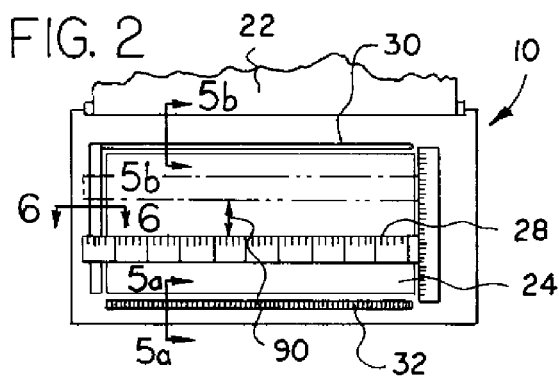
FIG. 2
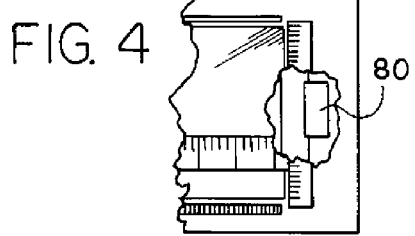
FIG. 4
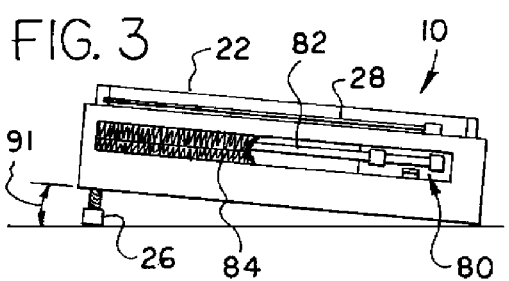
FIG. 3
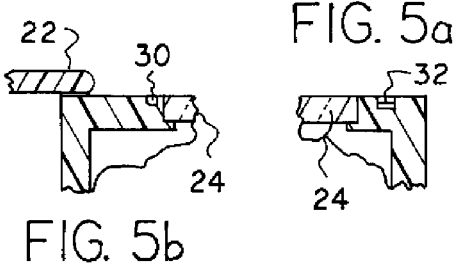
FIG. 5a
FIG. 5b

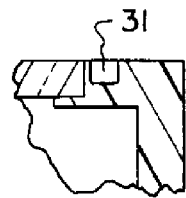
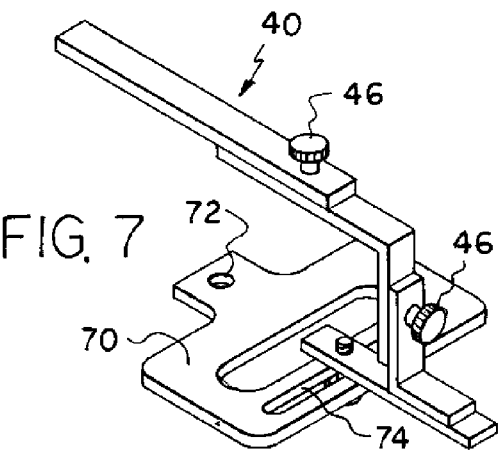
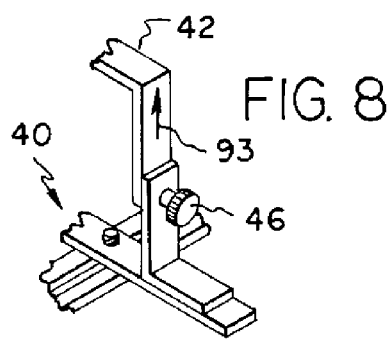
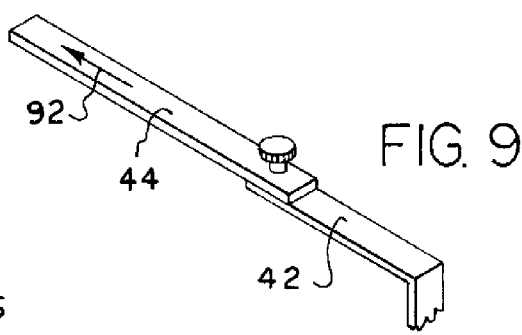
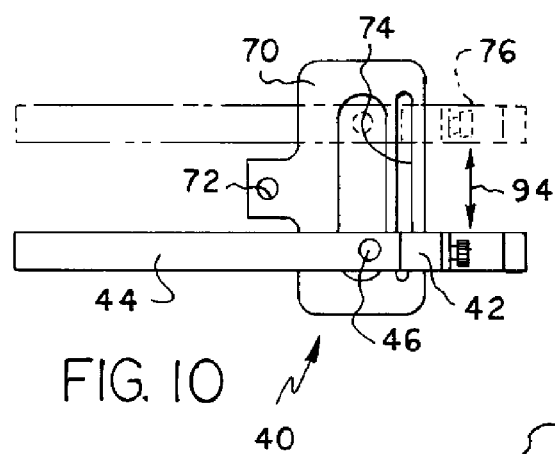
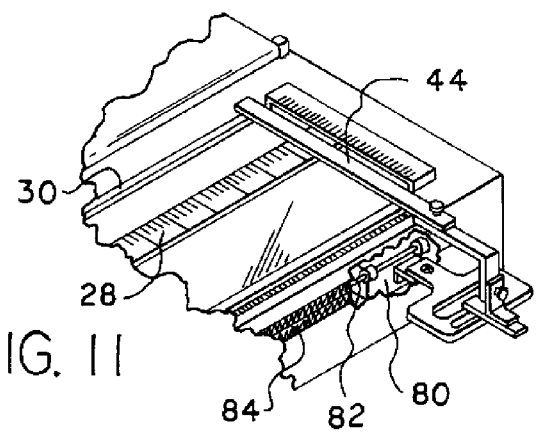

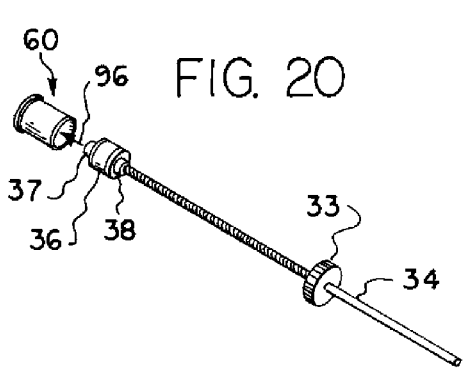
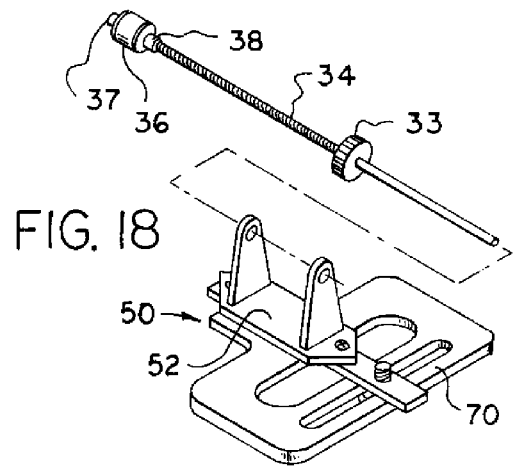
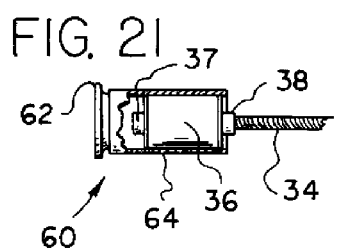
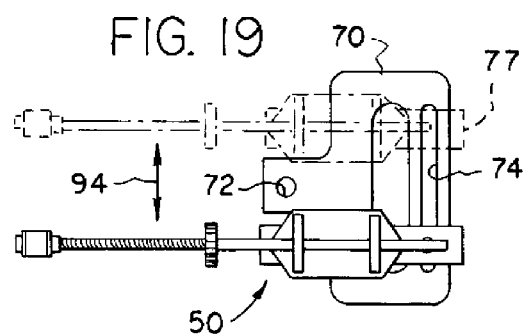
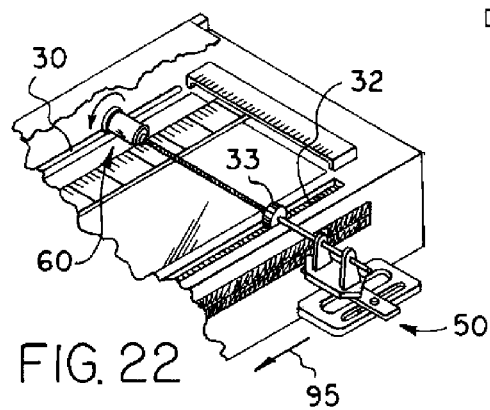
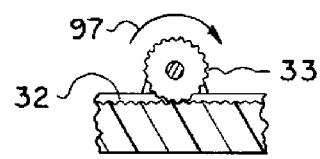
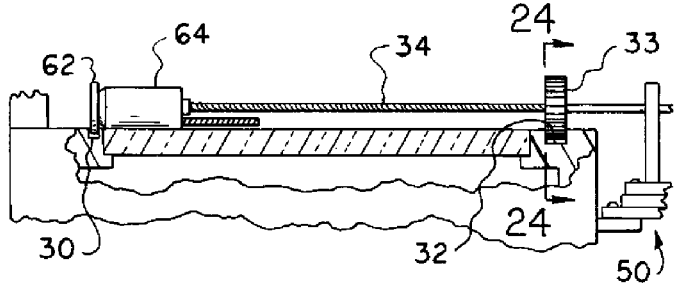

CYLINDRICAL OBJECT SCANNER

FIELD OF THE INVENTION

The present disclosure relates to scanners, and more particularly to a scanner that rotates and scans three-dimensional cylindrical objects along a two-dimensional plane.

BACKGROUND OF THE INVENTION

The basic concept of a scanner is well known in the prior art. Several devices have been invented to facilitate the scanning and producing reproductions of three-dimensional objects.

It is clear that no prior art patents disclose a scanner capable of scanning the minute details of the surface of a cylindrical object. Traditionally, flatbed scanners have been used to scan images of two-dimensional objects, or alternatively scan two-dimensional scans of three-dimensional objects. Systems have been developed which modify flatbed scanners to attempt to scan three-dimensional objects. For example U.S. Pat. No. 5,898,508, issued to Bekanich, discloses an apparatus for producing multidimensional images or reproductions of three-dimensional objects. The Bekanich invention attempted to solve the problem of scanning a three-dimensional object by surrounding the object with housing with a reflective surface. However, this solution does not satisfactorily reproduce the minute images on the surface of a cylindrical object such as a fingerprint on a shell casing and reproduce the image as a two-dimensional image for forensic analysis.

Many scanning systems use triangulation schemes whereby multiple cameras take images which can then be recreated within a coordinate system. An example of a three-dimensional scanner designs is U.S. Pat. No. 6,122,481, issued to Lee et al. for three-dimensional scanning system that scans a three-dimensional object and calculates a three-dimensional coordinate data from a surface of the object. The three-dimensional scanning system has a photoelectron detector, a rotational scanning device, a drive device, an image processing circuit, and an operational control device. The problem involves scanning an object that is three-dimensional with a flatbed scanner that is two-dimensional. The inventor has attempted to solve the problem by using a rotating scanning device that scans the outer surface of a three-dimensional object. However, this solution is inadequate because it does not allow the scanning device to scan the entire surface area of the object while in close proximity to the glass of the scanner.

Alternatively, manipulating lighting to create multiple scans having different degrees of shading can be processed to recreate a three-dimensional image. However, in each of these systems, the entire surface of the object is not scanned. Additionally, many of these systems are only capable of scanning a surface contour and do not truly scan the surface. U.S. Pat. No. 6,885,479 issued to Pilu for a curled surface imaging system for de-warping images of a developable surface, including developable curled surfaces, and in particular of images of curled documents. However, in the Pilu scanner, the object to be scanned needs to be entirely illuminated with light of sufficient quantity under the same conditions from outside the scanning area of the camera, so as not to interfere with the scanning of the camera between the camera and the object. As a result, a plurality of lighting apparatuses are installed around the camera. If the camera is far away from the object to be scanned, lighting apparatuses producing a great amount of light are used.

Other prior art imaging processes employ cameras which rotate slowly about a three-dimensional object and signals from those cameras are fed into suitable computers to produce two or three-dimensional images of the three-dimensional object. Still other systems such as a Cyberware 3-D digitizer employ laser and video based technology to scan a three-dimensional object and then feed that information to suitable computer operated equipment to produce two or three-dimensional reproductions of the three-dimensional object. The signal information may also be sent to an automated milling machine which may create a physical reproduction of the three-dimensional object. Although this system is highly sophisticated and accurate, it is very expensive and, as a practical matter, is not affordable to many users.

Thus it is readily apparent that there is a long felt need for a scanning device which scans the entire surface of a three-dimensional object modified to rotate a three-dimensional cylindrical object as it is being scanned along the two-dimensional surface of the flatbed scanner.

SUMMARY OF THE INVENTION

It is accordingly a primary object of the present disclosure to provide a flatbed scanner with a carriage assembly that rotates and scans the surface of three-dimensional cylindrical objects along a two-dimensional plane of the glass pane of the scanner.

It is another object of the present disclosure to provide an apparatus for producing a two-dimensional image of a fingerprint from the surface of a cylindrical object such as a shell casing.

It is yet another object of the present disclosure to provide a cylindrical object scanner that is lightweight and portable.

It is another object of the present invention to provide a cylindrical object scanner that mechanically rotates a cylindrical shell casing.

It is a further object of the present disclosure to provide a cylindrical object scanner that scans the entire circumferential surface of any sized cylindrical object as it rolls across the glass of a flatbed scanner.

The above and other objects are accomplished in accordance with the present disclosure having a scanner for scanning an object having a circumferential surface comprising a housing with a glass pane defining an internal area containing a camera assembly configured to scan the circumferential surface of an object, and a carriage assembly to move the object across the glass pane of the scanner.

The present disclosure satisfies the above-mentioned needs, as well as others, and overcomes the deficiencies in devices heretofore developed.

These and other objects, features, and advantages of the present invention will become apparent upon a reading of the detailed description and claims in view of the several drawing figures forming a part of the specification.

BRIEF DESCRIPTION OF THE DRAWINGS

The disclosure is explained below by means of schematic drawings (see attached) and with additional details. The drawings include:

FIG. 1 is a perspective view of the cylindrical object scanner showing multiple embodiments according to the disclosure.

FIG. 2 is an overhead view of the cylindrical object scanner with the light cover broken away according to the disclosure.

FIG. 3 is a side view of the cylindrical object scanner according to the disclosure.

FIG. 4 is a top perspective view showing the internal camera of the cylindrical object scanner according to the disclosure.

FIG. 5a is a breakaway perspective view showing one embodiment of the cylindrical object scanner according to the disclosure.

FIG. 5b is a breakaway perspective view showing another embodiment of the cylindrical object scanner according to the disclosure.

FIG. 6 is a breakaway perspective view showing yet another embodiment of the cylindrical object scanner according to the disclosure.

FIG. 7 is a perspective view of a first embodiment of the carriage assembly of the cylindrical object scanner according to the disclosure.

FIG. 8 is a partial view of a first embodiment of the carriage assembly of the cylindrical object scanner according to the disclosure.

FIG. 9 is yet another partial view of a first embodiment of the carriage assembly of the cylindrical object scanner according to the disclosure.

FIG. 10 is a top view of a first embodiment of the carriage assembly of the cylindrical object scanner according to the disclosure.

FIG. 11 is a partial perspective view of a first embodiment of the carriage assembly attached to the cylindrical object scanner according to the disclosure.

FIG. 18 is a partially exploded view of a second embodiment of the carriage assembly of the cylindrical object scanner according to the disclosure.

FIG. 19 is an overhead view of a second embodiment of the carriage assembly of the cylindrical object scanner according to the disclosure.

FIG. 20 is a perspective view of a cylindrical object being attached to the spindle of a second embodiment of the carriage assembly of the cylindrical object scanner according to the disclosure.

FIG. 21 is a broken-away view of a cylindrical object attached to the spindle of a second embodiment of the carriage assembly of the cylindrical object scanner according to the disclosure.

FIG. 22 is a partial perspective view of a second embodiment of the carriage assembly attached to the cylindrical object scanner according to the disclosure.

FIG. 23 is a partial side view of a second embodiment of the carriage assembly attached to the cylindrical object scanner according to the disclosure.

FIG. 24 is a partial schematic view of a second embodiment of the carriage assembly attached to the cylindrical object scanner according to the disclosure.

DETAILED DESCRIPTION OF THE INVENTION

Description of the Cylindrical Object Scanner

Figure 14:
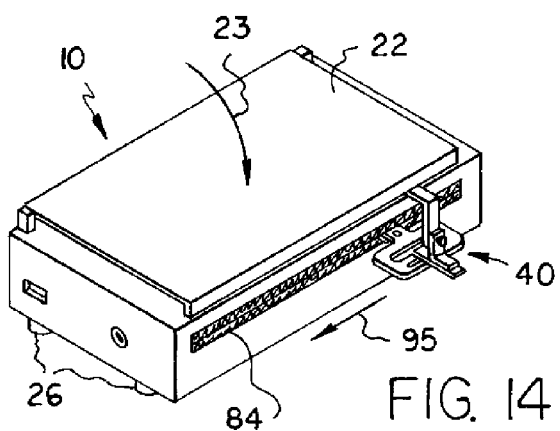
FIG. 14 is a perspective view of the cylindrical object scanner according to the disclosure.

At the outset, it should be clearly understood that like reference numerals are intended to identify the same structural elements, portions, or surfaces consistently throughout the several drawing FIGS., as may be further described or explained by the entire written specification of which this detailed description is an integral part. The drawings are intended to be read together with the specification and are to be construed as a portion of the entire "written description" of this invention as required by 35 U.S.C. §112.

The present disclosure presents a scanner for scanning an object having a circumferential surface comprising a housing with a glass pane defining an internal area containing a camera assembly configured to scan the circumferential surface of an object, and a carriage assembly to rotatably move the object across the glass pane of the scanner.

In a preferred embodiment, the present system is used to scan the surface of a shell casing from a used ammunition round to extract fingerprint information. (In the industry, a shell casing may also sometimes be referred to as a shell case). Traditionally, fingerprint forensic data is collected by dusting a surface allowing the dust to adhere to the remnants of oil left behind after an object is touched. Clear tape is then used to fix the dust so that the fingerprint can be scanned into a computer. Shell casings, however, present difficulties for extracting fingerprints because of their small size and tight curvature. Fingerprints are often smudged or are incomplete using the traditional forensic approach. Therefore, the present disclosure provides for a device and method to scan fingerprints from shell casings without requiring the use of tape. The rate of rotation correlates with the translation of the scanner raster ensuring that the scan correlates with the object surface at the time of image capture.

Averting now to the drawings, with reference to FIG. 1, a side perspective view is depicting a scanner 10 according to the disclosure. Scanner 10 is generally comprised of a housing having a bottom, four sides, and a glass pane 24 defining an internal area containing a camera assembly. A carriage assembly 40, 50 is attached to the camera assembly of scanner 10. A cylindrical object to be scanned is placed on glass pane 24 between reference ruler 28 and rim guide 30. Scanning the surface of a cylindrical object is initialized by a computer 86 connected to peripheral port 88, or is initialized by any other method commonly known in the art. Scanner 10 is equipped with a light cover 22, which is preferably closed during the imaging process for best results. When scanner 10 is initiated by computer 86 or another means, carriage assembly 40, 50 will advance a cylindrical object along glass pane 24 such that the cylindrical object rotates across the glass pane 24 in synchronous motion with the camera assembly of scanner 10, allowing scanner 10 to scan the entire surface of the cylindrical object.

In the preferred embodiment of the disclosure, scanner 10 can be equipped with at least two separate carriage assemblies 40, 50. In the first embodiment, a push bar carriage assembly 40 is disclosed. Push bar carriage assembly 40 is positioned such that an extension sits behind the cylindrical object to be scanned, and pushes the cylindrical object rotatably forward across glass pane 24. In the preferred embodiment of the disclosure, the cylindrical object is encouraged to roll in a straight line across glass pane 24 by utilizing reference ruler 28 in conjunction with rim guide 30. Once the cylindrical object reaches the end of glass pane 24, push bar carriage assembly 40 will preferably deposit the cylindrical object into object slot 31, where the cylindrical object will remain while the imaging mechanism with attached push bar carriage assembly 40 returns to its starting position.

In a second embodiment of the disclosure, a rotating carriage assembly 50 is disclosed. Use of rotating carriage assembly 50 is preferred when the cylindrical object to be scanned is also hollow, such as a spent shell casing from a round of fired ammunition. Rotating carriage assembly 50 works in conjunction with gear track 32 to both rotate the cylindrical object as well as keep the cylindrical object moving in a straight line across glass pane 24.

Referring now to FIG. 2, there is depicted an overhead view of scanner 10 with light cover 22 broken away. When scanning the surface of a cylindrical object, it may be preferable to have a ruler embedded within the scanned image to serve as a frame of reference. For instance, when forensic police officers scan objects for fingerprints, the scanned image needs to illustrate a ruler directly next to and perpendicular to the fingerprint image. Accordingly, the preferred embodiment discloses reference ruler 28. Reference ruler 28 is preferably marked with both metric and English markings, and is also preferably marked on both the top and bottom facing sides. Markings on the top facing side of reference ruler 28 will allow a user to conduct measurements, while markings on the bottom facing side of reference ruler 28 are configured in such a way that said markings are visible on an end-product scanned image. Reference ruler 28 is adjustable across glass pane 24 along ruler arrow 90, thus allowing the user to either position reference ruler 28 directly next to a cylindrical object to be scanned, or, if reference ruler 28 is not needed, to position it outside of the viewing area of the scanner 10 imaging instrument.

In addition to having a ruler serving as a point of reference on a scanned image, it is also preferable to ensure that a cylindrical object being scanned is rolled across glass pane 24 in a straight line. If a cylindrical object to be scanned was not perfectly round, or if said object was to have a raised lip or similar feature at one end, the object would want to move in and arc-shaped path when rolled. In order of compensate for this arcing, reference ruler 28 preferably has a thickness which can serve as a guide to a cylindrical object to keep said object rolling in a straight line. Said thickness of reference ruler 28 can work in conjunction with rim guide 30 as well as gear track 32 to keep a cylindrical object on line. If the cylindrical object to be scanned has a uniform surface (i.e. it does not have a raised lip to rest within rim guide 30), then scanner 10 will preferably have, in place of rim guide 30, a raised edge (not pictured) to serve as a guide to help keep the object rotating in a straight line across glass pane 24.

With reference now to FIG. 3, there is depicted a side view of scanner 10. From the side, the thickness of reference ruler 28 is depicted along with the side of light cover 22. Camera assembly 80 is depicted at the starting position of camera track 82. There exists an opening in the side of scanner 10 so as to allow the connection of a carriage assembly directly to camera assembly 80. In order to keep dust and other debris away from the internal mechanisms of scanner 10, the opening in the side of scanner 10 is preferably covered by a set of bristles 84. Bristles 84 are split down the middle to allow for a carriage assembly to travel back and forth along camera track 82 while remaining external and adjacent to scanner 10.

FIG. 3 also shows adjustable foot 26 raising one end of scanner 10 off the ground along foot adjustment arrow 91. The purpose of adjustable foot 26 is it allow a cylindrical object to be scanned along an incline surface, which will serve to keep the cylindrical object in line with camera assembly 80, else there would be a risk of the cylindrical object rolling ahead of camera assembly 80 during the scanning process.

With reference now to FIG. 4, there is depicted a top perspective view showing camera assembly 80 of scanner 10 according to the disclosure. Camera assembly 80 is preferably positioned directly underneath the object to be scanned for best results. However, if the positioning of camera assembly 80 is not dynamic, then camera assembly 80 is preferably located in the general center of scanner 10.

With reference now to FIGS. 5a and 5b, there are depicted breakaway perspective views showing different embodiments of scanner 10 according to the disclosure. FIG. 5a shows gear track 32 adjacent to glass pane 24. Gear track 32 is used in conjunction with rotating carriage assembly 50 (see FIG. 22). In other embodiments of the disclosure, gear track 32 is located on the opposite side of glass pane 24. Referring now to FIG. 5b, rim guide 30 is positioned adjacent to glass pane 24, inside of light cover 22. The purpose of rim guide 30 is to serve as a surface depression, accounting for cylindrical objects that have a lip on one end, such as a shell casing. If rim guide 30 was not there, a cylindrical object with a lip on one end would not sit flush against glass pane 24, which could distort scanning results. In addition, when a cylindrical object with a raised lip is rotated along glass pane 24, the raised lip would cause the cylindrical object to not rotate in a straight line, further distorting scanning results. In additional embodiments of the disclosure, rim guide 30 is located adjacent to glass pane 24 on the side of scanner 10 opposite to light cover 22.

With reference now to FIG. 6, there is depicted a breakaway perspective view showing another embodiment of scanner 10 according to the disclosure. When scanner 10 is configured in such a way that a cylindrical object to be scanned is pushed across glass pane 24 (as opposed to being manually rotated), the cylindrical object is preferably deposited into object slot 31. If scanner 10 is being operated in the incline position (see FIG. 3), object slot 31 will prevent a cylindrical object from rolling uncontrollably back along glass pane 24 once camera assembly 80 with attached carriage assembly retreats back to its starting position (see FIG. 17).

With reference now to FIG. 7, there is depicted a perspective view of a push bar carriage assembly 40 of the scanner 10 according to the disclosure. Push bar carriage assembly 40 is has an assembly base 70, said assembly base 70 having a scanner attachment point 72 and alignment slot 74. A push bar assembly is attached to assembly base 70 and adjusted using set screws 46, or any other securing means known in the art.

With reference now to FIG. 8, there is depicted a partial view of push bar carriage assembly 40 of scanner 10 according to the disclosure. The height of push bar arm 42 is adjustable along arm vertical adjustment arrow 93, and is locked into place using set screw 46. The overall diameter of the cylindrical object to be scanned will dictate the height of push bar arm 42 needed.

With reference now to FIG. 9, there is depicted another partial view of push bar carriage assembly 40 of scanner 10 according to the disclosure. Push bar arm 42 is preferably equipped with push bar extension 44, which serves to extend push bar arm 42 outwards along arm horizontal adjustment arrow 92.

With reference now to FIG. 10, there is depicted a top view of push bar carriage assembly 40 of scanner 10 according to the disclosure. Depending on the size of the diameter of the cylindrical object to be scanned, it is preferable to be able to adjust precisely where the scanner camera and said object are aligned. Accordingly, push bar arm 42 is adjustable across assembly base 70 by sliding within alignment slot 74 along scan alignment arrow 94 (as illustrated by broken lines 76).

With reference now to FIG. 11, there is depicted a partial perspective view of push bar carriage assembly 40 attached to scanner 10 according to the disclosure. A portion of bristles 84 are broken away to show camera assembly 80 and camera track 82. Push bar extension 44 is shown to extend all the way to rim guide 30. In the instant embodiment, the object to be scanned will be positioned in between rim guide 30 and reference ruler 28, which both preferably serve as guides to keep the cylindrical object rolling in a straight line. During operation, push bar extension 44 will roll the cylindrical object forward, parallel to camera track 82.

Figure 12:
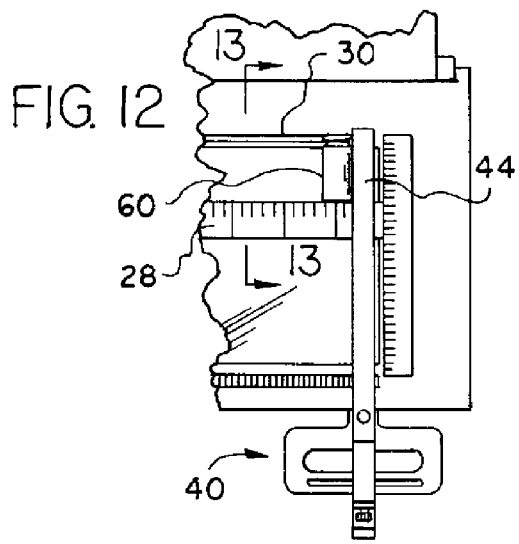
FIG. 12 is a partial top view of a first embodiment of the carriage assembly attached to the cylindrical object scanner according to the disclosure.

With reference now to FIG. 12, there is depicted a partial top view of push bar carriage assembly 40 attached to scanner 10 according to the disclosure. Shell casing 60 is resting in the starting position of the scanner adjacent to push bar extension 44. Shell casing 60 has a raised rim (see FIG. 13), which is resting in rim guide 30. Reference ruler 28 has been movably positioned to the end of shell casing 60 opposite rim guide 30.

Figure 13:
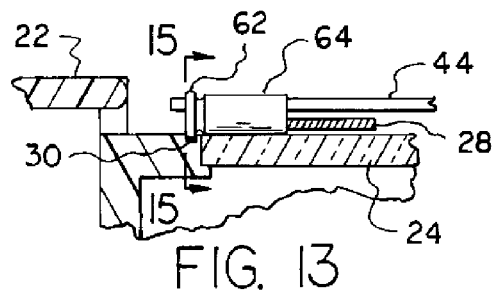
FIG. 13 is a partial side view of FIG. 12 of a first embodiment of carriage assembly attached to the cylindrical object scanner according to the disclosure.

With reference now to FIG. 13, there is depicted a partial side view of FIG. 12 of a push bar carriage assembly 40 attached to scanner 10 according to the disclosure. Casing rim 62 is shown resting within rim guide 30, which allows casing body 64 to sit flush against glass pane 24. Casing body 64 is in a starting position adjacent to push bar extension 44, and is further secured in place via reference ruler 28. The cylindrical object shown is now ready to be scanned once light cover 22 is closed.

With reference now to FIG. 14, there is depicted a perspective view of scanner 10 according to the disclosure. Light cover 22 has been folded to the "close" or "run" position along cover closing arrow 23. Push bar carriage assembly 40 is attached to camera assembly 80 (obstructed by bristles 84) and is in the starting position. Adjustable feet 26 have been raised so that scanner 10 is slightly inclined. Once operation of scanner 10 is commenced, push bar carriage assembly 40 will move along camera track arrow 95, simultaneously pushing across a cylindrical object whose surface is to be scanned.

Figure 16:
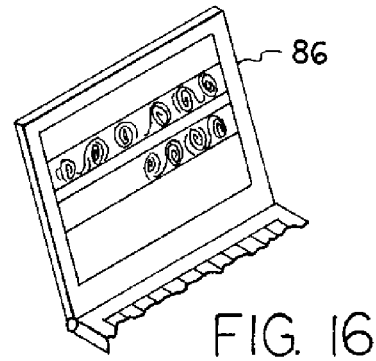
FIG. 16 is a view of a sample output of the cylindrical object scanner according to the disclosure.
Figure 15:
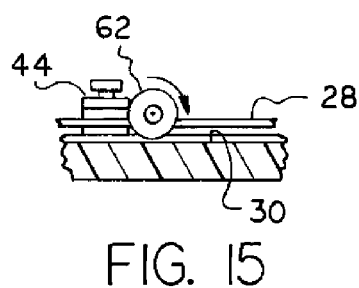
FIG. 15 is a schematic side view of a cylindrical object being rolled along the two-dimensional plane of the surface of the cylindrical object scanner according to the disclosure.

With reference now to FIG. 15, there is depicted a schematic side view of a shell casing being rolled along the two-dimensional plane of the surface of scanner 10 according to the disclosure. Casing rim 62 is sitting adjacent to push bar extension 44 within rim guide 30. The shell casing is being further secured by reference ruler 28. During operation, push bar extension 44 will push the cylindrical object across the surface of scanner 10 causing the cylindrical object to roll in line with the camera assembly 80 of the scanner. Consequently, the entire surface of the cylindrical object will be recorded by scanner 10. In the instant embodiment, the cylindrical object is in the form of a shell casing, the circumferential surface of which is scanned for fingerprints. A sample output of the scanning results on computer 86 is depicted in FIG. 16.

Figure 17:
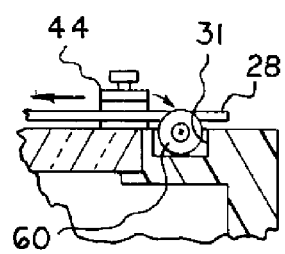
FIG. 17 is a partial perspective view of one embodiment of the cylindrical object scanner according to the disclosure.

With reference now to FIG. 17, there is depicted a partial perspective view of one embodiment of scanner 10 according to the disclosure. When using push bar extension 44 with scanner 10, it is preferable that the cylindrical object being scanned is deposited into an open slot once the scanner has been completely extended in one direction, prior to the push bar extension returning to the starting position. Accordingly, the cylindrical object will be prevented from rolling unpredictably across the surface of scanner 10. FIG. 17 illustrates shell casing 60, said shell casing 60 being advanced by push bar extension 44 and secured by reference ruler 28, and sad casing being deposited into object slot 31 prior to push bar extension 44 returning to its original position.

With reference now to FIG. 18, there is depicted a partially exploded view of a rotating carriage assembly 50 of scanner 10 according to the disclosure. Rotating carriage assembly 50 is generally comprised of assembly base 70, threaded rod 34, and threaded rod guide 52. Attached to threaded rod 34 are gear 33, compression mandrel 36, stationary nut 37, and movable nut 38. Threaded rod 34 is configured to rest loosely within threaded rod guide 52.

With reference now to FIG. 19, there is depicted an overhead view of rotating carriage assembly 50 of scanner 10 according to the disclosure. Assembly base 70 is removably attachable to the camera assembly of a scanner (not shown) via scanner attachment point 72. The alignment of rotating carriage assembly 50 is adjustable across assembly base 70 by sliding the threaded rod guide within alignment slot 74 along scan alignment arrow 94 (as illustrated by broken lines 77).

With reference now to FIG. 20, there is depicted a perspective view of shell casing 60 being attached to threaded rod 34 of rotating carriage assembly 50 of scanner 10 according to the disclosure. Compression mandrel 36 of threaded rod 34 is removably coupled to the hollow interior of shell casing 60 along mandrel arrow 96. FIG. 21 depicts a broken-away view of shell casing 60 attached to the compression mandrel 36. Compression mandrel 36 is secured to the interior of casing body 64 by tightening movable nut 38.

With reference now to FIG. 22, there is depicted a partial perspective view of rotating carriage assembly 50 attached to scanner 10 according to the disclosure. Gear 33 of rotating carriage assembly 50 is placed on gear track 32, which serves to keep shell casing 60 rotating in a straight, even line. Likewise, the rim of shell casing 60 is positioned within rim guide 30. From the starting position, rotating carriage assembly 50 will advance along camera track arrow 95, rotating shell casing 60 in the process.

With reference now to FIG. 23, there is depicted a partial side view of rotating carriage assembly 50 attached to scanner 10 according to the disclosure. Gear 33 is positioned onto gear track 32, and threaded rod 34 is secured to casing body 64. Casing rim 62 is positioned within rim guide 30, allowing casing body 64 to sit flush against the surface of the scanner.

With reference now to FIG. 24, there is depicted a partial schematic view of rotating carriage assembly 50 attached to scanner 10 according to the disclosure. Gear 33 is positioned in line with gear track 32. During operation of the scanner, gear 33 will rotate across gear track 32 along gear track arrow 97, simultaneously rotating an attached cylindrical object in line with the camera assembly of the scanner.

While a preferred form of this disclosure has been described above and shown in the accompanying drawings, it should be understood that applicant does not intend to be limited to the particular details described above and illustrated in the accompanying drawings, but intends to be limited only to the scope of the invention as defined by the following claims. In this regard, the term "means for" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

What is claimed is:

1. A scanner for scanning an object having a circumferential surface comprising:
    a housing with a transparent surface defining an internal area containing a camera assembly configured to scan said circumferential surface of said object; and a rotating means configured to rotate said object across said transparent surface of the scanner; wherein said rotating means is configured to rotate said object across said transparent surface in synchronous motion with the movement of said camera assembly.

2. The scanner of claim 1 wherein said scanner is a flatbed scanner.

3. The scanner of claim 2 wherein said object has a height, length and a diameter and said object is cylindrical in shape.

4. The scanner of claim 3 wherein said camera assembly has a camera, a light source and mirror.

5. The scanner of claim 4 wherein said rotating means has a base configured to adjust alignment of the object in relation to said camera based upon the diameter of the object.

6. The scanner of claim 5 wherein said object has a hollow interior.

7. The scanner of claim 6 wherein said rotating means is further comprised of a threaded rod with a compression mandrel to removably couple to said hollow interior of said object.

8. The scanner of claim 6 wherein said housing has a gear track parallel to said transparent surface to wherein said gear track is configured to guide the threaded rod across the transparent surface of the scanner.

9. The scanner of claim 5 wherein said rotating means is further comprised of a push bar arm and a push bar extension.

10. The scanner of claim 9 wherein said push bar arm and push bar extension are configured to roll said object across said transparent surface.

11. The scanner of claim 9 wherein said push bar arm is configured to adjust alignment of the object in relation to said camera based upon the height of the object.

12. The scanner of claim 9 wherein said push bar extension is configured to adjust alignment of the object in relation to said camera based upon the length of the object.

13. The scanner of claim 2 wherein said object is a shell casing with a rim.

14. The scanner of claim 13 wherein said housing has a rim guide that extends along said transparent surface to position said shell casing.

15. The scanner of claim 14 wherein said housing has an adjustable ruler positioned parallel to said rim guide along said transparent surface.

16. The scanner of claim 15 wherein said adjustable ruler is adjustable along an axis perpendicular to said rim guide.

17. The scanner of claim 16 wherein said ruler has a thickness that is configured to act as a guide to keep the shell casing positioned above the camera during scanning.

18. A flat bed scanner for scanning a cylindrical object having a circumferential surface comprising:
    a housing with a glass pane defining an internal area containing a camera assembly configured to scan said circumferential surface of said cylindrical object; and
    a carriage assembly comprising a threaded rod coupled with a mandrel to rotate said object across said glass pane of the scanner in synchronous motion with the movement of said camera assembly; wherein said carriage assembly is configured to adjust alignment of the object in relation to said camera.

19. A flat bed scanner for scanning a cylindrical object having a circumferential surface comprising:
    a housing with a glass pane defining an internal area containing a camera assembly configured to scan said circumferential surface of said cylindrical object; and
    a carriage assembly comprising a push arm and push extension to move said object across said glass pane of the scanner in synchronous motion with the movement of said camera assembly; wherein said carriage assembly is configured to adjust alignment of the object in relation to said camera.

\* \* \* \* \*